Patented Oct. 29, 1929

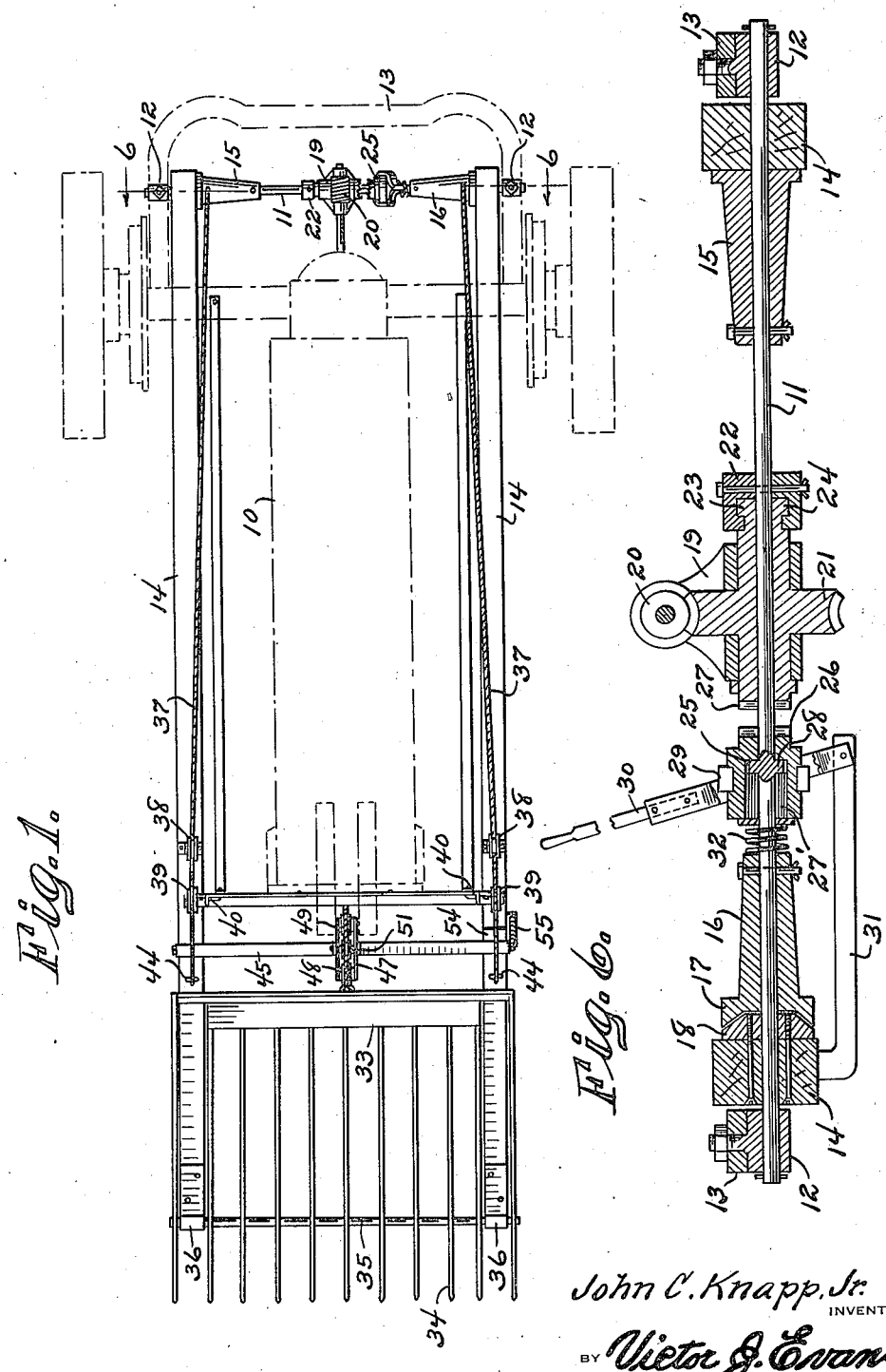

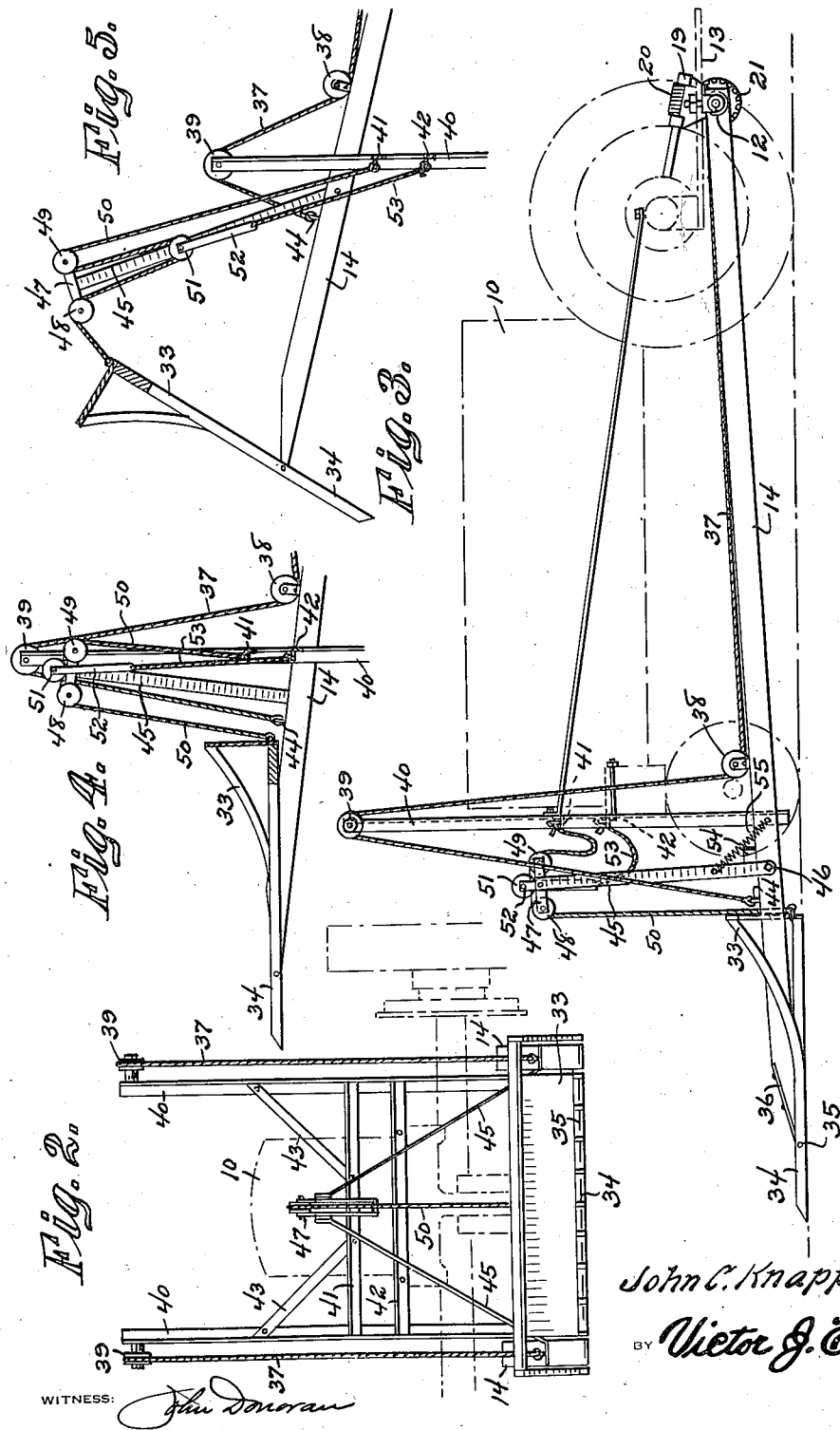

1,733,969

UNITED STATES PATENT OFFICE

JOHN C. KNAPP, JR., OF MADISON, NEBRASKA

LOADING DEVICE

Application filed May 8, 1928. Serial No. 276,156.

This invention relates to improvements in loading devices adapted for use upon motor vehicles and the like.

An object of the invention comprehends a power take-off mechanism for the vehicle.

Another object of the invention contemplates drums operable by the power take off mechanism.

A further object of the invention embodies a shift lever adapted to selectively operate the power take off mechanism and brake the drums.

An additional object of the invention consists of a loading carrier operable through connection with the drums to raise and lower the same.

More specifically stated the load carrier is provided with a tilting apparatus rendered active when the carrier is raised a predetermined height.

With the above and other objects in view, the invention further consists of the following novel features and details of contsruction, to be hereinafter more fully described, illustrated in the accompanying drawings and pointed out in the appended claim.

In the drawings:—

Figure 1 is a top plan view of the invention.

Figure 2 is a front elevation thereof.

Figure 3 is a side elevation of the invention.

Figure 4 is a fragmentary side elevation of the invention when elevated.

Figure 5 is a view similar to Figure 4 illustrating the carrier disposed in dumping position.

Figure 6 is a longitudinal sectional view taken on line 6—6 of Figure 1 through the power take-off and braking apparatus.

Referring to the drawings in detail, wherein like characters of reference denote corresponding parts, the reference character 10 indicates a tractor or other motor vehicle, which, as shown, is a McCormick Deering Farmall tractor.

This particular tractor is disclosed for purposes of illustration only and it is to be understood that the invention could be equally and effectually as well applied upon the Fordson tractor, Holt's Steel Mule, etc.

The power take-off, as mentioned in the foregoing, contemplates a shaft 11 having the outermost ends thereof journaled within bearing members 12 carried upon the opposed sides of a draw bar 13 upon the tractor 10. Lifting beams 14, carried upon the shaft 11 upon the inner sides of the draw bar 11 and bearings 12 therefor, are extended forwardly for appreciable distances beyond the foremost end of the tractor, the purpose of which will be presently apparent.

Drums 15 and 16 are fixed upon the shaft 11, the latter drum being provided with a seat 17 adapted to accommodate a cone member 18 carried upon the adjacent side of one of the lifting beams 14.

A differential housing 19, having a worm 20 operatively engaged with a differential mechanism of the tractor, is adapted to operate a worm gear 21 journaled upon the shaft 11. A boxing 22, fixed upon the shaft 11 and having a circumferential groove 23 thereon, is adapted to accommodate a flange portion 24 projected from one end of a bearing sleeve for the worm gear 14 within the housing 19 whereby the worm gear 21 will be held in meshing engagement with the worm 20. A clutch, embodying a sleeve member 25 fixed upon the shaft 11, is provided with ratchet teeth 26 upon one end adapted to selectively engage ratchet teeth 27 provided upon the opposed bearing sleeve for the worm gear 21. The sleeve 25 is provided with a key way slot 27' adapted to accommodate a key 28 carried by the shaft 11. A collar or band 29, carried within a circumferential groove in the outer side of the sleeve 25, is adapted for connection with a shift lever 30.

An arm 31 is adapted to establish means of connection between the lifting beam 14 carrying the cone member 18 and the adjacent end of the shift lever 30. A compression spring 32, encircling the shaft 11 and having the opposed end convolutions thereof engaging the adjacent ends of the drum 16 and sleeve member 25, is adapted to normally retain the latter in the position illustrated in Figure 6 of the drawings.

The lifting apparatus consists of a fork 33 having the tines 34 therefor eccentrically mounted upon a shaft member 35 carried within strap bearings 36 upon the forward ends of the lifting beams 14. The inner portion of the fork extends downwardly between the lifting beams 14 when lowered to occupy a loading position, as illustrated in Figure 3 of the drawings and engageable with the upper sides of the lifting beam when elevated as manifest from the illustration of the invention in Figure 4 of the drawings.

Cables 37, wound upon the drums 15 and 16, are passed over pulley wheels 38, carried upon the upper sides of the lifting beams 14 and over pulley wheels 39 carried upon the upper ends of the spaced standards 40 having connection with cross bars 41 and 42 carried upon the front of the tractor 10. Braces 43 being adapted to establish means of connection between the cross bar 41 and the adjacent standards 40 to prevent weaving action of the completed frame. The opposite ends of the cables 37 are adapted for connection with screw eyes 44 included upon the upper sides of the lifting beams 14 in advance of the tractor 10.

Supporting braces 45, pivotally connected, as indicated at 46, with the lifting beams 14, are inwardly, upwardly and obliquely disposed therefrom for connection with the intermediate portions of plate members 47. Pulley wheels 48 and 49 are journaled between the ends of the plate members 47 and over which is trained a rope 50 having its respective ends connected with the cross bar 41 and rake 33.

A pulley wheel 51, pivotally mounted between space plates 52, is disposed immediately above the plates 47 and the plates 52 therefor are extended downwardly between said plates 47 whereby the pulley wheel 51 may repose and engage the outer surface of the rope 50 between the pulley wheels 48 and 49 respectively. The lowermost ends of the plate members 52 are adapted for connection with a pull rope 53 having connection at its opposite end with the cross bar 42.

The supporting pivotally mounted braces 45 are adapted to abut blocks or stops 54 carried upon the upper sides of the lifting beams 14 and which are retained thereagainst by retractile springs 55 having their respective ends connected with the brace members 45 and the lifting beams 14.

Manifestly by the provision of the fork, it is obviously understood that the invention, as shown in its present form, is designed for use in the handling of manure. The initial position of the invention is that of Figure 3 of the drawings, whereas the rake is engageable with the ground and may be slided toward a manure pile when the tractor 10 moves in a forward direction.

After the fork has been inserted within the pile, the same may be backed away with a load or be lifted from the first position. When it is desired to elevate the fork and lifting beams 14, the shift lever 30 is called into use and is moved to occupy a position the reverse of that as shown in Figure 6 of the drawings, whereby the ratchet teeth 26 of the sleeve 25 will engage the ratchet teeth 27 upon the adjacent bearing sleeve of the worm gear 21, whereby a driving connection is established between the differential housing of the tractor per se and the power take-off mechanism. Such action will transmit rotation to the shaft 11 while the tractor is in motion. The drums 15 and 16 will wind up the cables 37 thereon until the beams 14 have been raised to occupy the positions shown in Figure 4 of the drawings. The shift lever 30 is then moved to occupy a reverse position whereby the braking apparatus is called into use to brake the winding action of the drum 16, which, due to the fixed connection with the shaft 11 in conjunction with the drum 15, will brake both drums at once. The tractor may then be moved adjacent a wagon box or gondola and the shift lever 30 is again called into use to cause further winding of the cables 37 upon the respective drums whereby the lifting beams 14 will be elevated to occupy the positions illustrated in Figure 5 of the drawings, whereby the plate members 52 and pulley 51 carried thereby will be drawn downwardly between the plate members 47 to tighten the rope 50 whereby a rake 33 will be tilted to discharge the load carried thereby.

By the same token, it will be noted upon the release of the brake that the weight of the beams 14 and rake will be sufficient to return the lifting and loading apparatus to their respective initial positions.

The invention is susceptible of various changes in its form, proportions and minor details of construction, and the right is herein reserved to make such changes as properly fall within the scope of the appended claim.

Having thus described the invention, what is claimed is:—

A loading and lifting device for use upon and in conjunction with motor vehicles comprising lifting beams elevated at the forward ends thereof by said vehicle, a frame carried by the vehicle, a rake tiltably mounted upon the lifting beams, supporting braces carried by the lifting beams, plate members having pulley wheels journaled adjacent the ends thereof being pivotally mounted at intermediate portions between said braces, spaced plates having a pulley between their upper ends between the plate members and connected at their opposite ends with said frame, and a cable carried by the frame being passed over the pulley wheels and under the pulley precedent to connection with the rake.

In testimony whereof I affix my signature.

JOHN C. KNAPP, Jr.